(12) United States Patent
Filipp et al.

(10) Patent No.: US 8,721,821 B2
(45) Date of Patent: *May 13, 2014

(54) SEAM FILLERS FOR USE WITH DECORATIVE STITCHING OF VEHICLE INTERIOR COMPONENTS

(75) Inventors: William Filipp, Shelby Township, MI (US); George Grzywacz, Jr., Clinton Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,071

(22) Filed: Dec. 15, 2011

(65) Prior Publication Data

US 2013/0153122 A1 Jun. 20, 2013

(51) Int. Cl.
| | | |
|---|---|---|
| *B32B 7/08* | (2006.01) | |
| *B60N 2/58* | (2006.01) | |
| *B60N 2/60* | (2006.01) | |
| *B60R 13/02* | (2006.01) | |
| *B44C 3/00* | (2006.01) | |

(52) U.S. Cl.
CPC .............. *B60N 2/5883* (2013.01); *B60N 2/609* (2013.01); *B60R 13/02* (2013.01); *B60R 13/0256* (2013.01); *B44C 3/00* (2013.01); *B60R 2013/0293* (2013.01)
USPC ........................................................ 156/93

(58) Field of Classification Search
CPC ...... B60R 13/0256; B60R 21/04; B60R 3/02; B29L 2031/3008
USPC ............. 156/93, 307.1, 307.7, 293, 148, 291, 156/290; 428/103, 104, 187
See application file for complete search history.

(56) References Cited

U.S. PATENT DOCUMENTS

| | | | |
|---|---|---|---|
| 3,010,866 A | | 11/1961 | Douchet |
| 3,661,669 A | * | 5/1972 | Cairns ........................... 156/157 |
| 4,273,827 A | * | 6/1981 | Sweeney et al. ........... 428/316.6 |
| 4,400,422 A | * | 8/1983 | Smith ........................... 428/160 |
| 5,382,398 A | | 1/1995 | Draxlmaier, Jr. |

(Continued)

FOREIGN PATENT DOCUMENTS

| | | |
|---|---|---|
| DE | 102007057637 A1 | 6/2009 |
| JP | 2009196610 A | 9/2009 |

OTHER PUBLICATIONS

International Search Report for PCT application No. PCT/US2012/069153, dated Apr. 19, 2013, 3 pages.

(Continued)

*Primary Examiner* — Michael Orlando
*Assistant Examiner* — Marta Dulko
(74) *Attorney, Agent, or Firm* — Reising Ethington P.C.

(57) ABSTRACT

A vehicle interior component including decorative stitching along a stitch path includes a seam filler located between a component substrate and an overlying decorative covering. The seam filler lies along the stitch path and supports the decorative covering directly beneath at least a portion of a line of decorative stitching, where the covering may include a reduced thickness portion. The seam filler can have any number of configurations to prevent visual defects along the stitch path and/or to cause the appearance of simulated seams to be more realistic. The seam filler may be deposited along the stitch path as a curable filler material that cures, or it may be provided as a pre-formed piece for attachment to the decorative covering.

19 Claims, 2 Drawing Sheets

(56) References Cited

U.S. PATENT DOCUMENTS

| | | | |
|---|---|---|---|
| 5,395,473 A * | 3/1995 | Nixon | 156/291 |
| 7,052,566 B2 * | 5/2006 | Wright et al. | 156/93 |
| 7,210,372 B2 * | 5/2007 | Adachi et al. | 74/558 |
| 7,401,829 B2 * | 7/2008 | Michalski et al. | 296/1.08 |
| 7,588,814 B2 * | 9/2009 | Olley et al. | 428/102 |
| 7,690,318 B2 * | 4/2010 | Dooley et al. | 112/475.17 |
| 7,752,985 B2 * | 7/2010 | Morita et al. | 112/475.04 |
| 7,851,039 B2 * | 12/2010 | Boinais et al. | 428/103 |
| 8,231,750 B2 * | 7/2012 | Kreuzer | 156/73.5 |
| 8,287,685 B2 * | 10/2012 | Be et al. | 156/314 |
| 8,579,347 B2 * | 11/2013 | Filipp | 296/1.08 |
| 2006/0008624 A1 * | 1/2006 | Cowelchuk et al. | 428/174 |
| 2007/0022931 A1 * | 2/2007 | Wieczorek et al. | 112/475.06 |
| 2007/0199644 A1 * | 8/2007 | Flores et al. | 156/93 |
| 2008/0073807 A1 * | 3/2008 | Cowelchuk et al. | 264/46.4 |
| 2008/0217943 A1 * | 9/2008 | Iwata et al. | 296/24.34 |
| 2009/0246505 A1 * | 10/2009 | Evans et al. | 428/316.6 |
| 2010/0171333 A1 * | 7/2010 | Smith et al. | 296/1.08 |
| 2010/0294420 A1 * | 11/2010 | Cai et al. | 156/91 |
| 2013/0147228 A1 * | 6/2013 | Filipp | 296/70 |

OTHER PUBLICATIONS

Written Opinion for PCT/US2012/069153, dated Apr. 19, 2013, 4 pages.

* cited by examiner

SEAM FILLERS FOR USE WITH DECORATIVE STITCHING OF VEHICLE INTERIOR COMPONENTS

TECHNICAL FIELD

The present disclosure relates generally to vehicle interior coverings and, more particularly, to vehicle interior coverings that include decorative stitching.

BACKGROUND

Vehicle interiors utilize various types of decorative components to provide a desired aesthetic. Certain types of materials and components, such as leather or genuine wood trim, may traditionally provide a vehicle interior with a luxurious feel because the cost of such materials is usually high, making them affordable only to purchasers of expensive vehicles. One distinctive feature of leather trim materials is what may be termed a "cut-and-sew" look, where pieces of leather material are hand-sewn together, often with decorative stitching, to form a covering to fit the contours of various types of interior components. Some efforts have been made to simulate such a hand-sewn look to make it more affordable for use in less expensive vehicles.

U.S. Pat. No. 5,382,398 to Draxlmaier is directed to the use of a recess or rib that is used to guide a sewing operation during manufacture of a padded interior component with stitching. The rib facilitates accurate location of the stitching along the proper line. One embodiment of the Draxlmaier reference includes an abutment fabric embedded within the cushioning foam layer that the stitching extends through. Draxlmaier does not describe any purpose for the abutment fabric, but it may help to retain the stitching at its lower end within the cushioning foam.

SUMMARY

According to one embodiment, a method of making a vehicle interior component having decorative stitching is provided. The method includes the steps of: (a) providing a decorative covering and a vehicle interior component substrate; (b) sewing a line of decorative stitching through the decorative covering along a stitch path; (c) depositing a curable filler material along the covering stitch path or along a corresponding substrate location or along both; and (d) disposing the decorative covering over the component substrate so that the covering stitch path is aligned over the corresponding substrate location.

In another embodiment, the step of depositing a curable filler material includes extruding a thermoplastic filler material.

In another embodiment, the step of depositing a curable filler material includes depositing a thermosetting filler material.

In another embodiment, the method includes depositing the curable filler material along the stitch path at an inner surface of the decorative covering.

In another embodiment, the step of sewing a line of decorative stitching is performed before the step of depositing a curable filler material.

In another embodiment, the method includes depositing an amount of curable filler material in excess of an amount required to fill a reduced thickness portion of the covering formed during the step of sewing the line of decorative stitching.

In another embodiment, the method includes removing at least some of an excess amount of curable filler material so that the curable filler material is substantially flush with the inner surface of the covering.

In another embodiment, the method includes at least partially curing the filler material after depositing the curable filler material and before disposing the decorative covering over the substrate.

In accordance with another embodiment, a method of making vehicle interior components having common substrates and different outward appearances is provided. The method includes the steps of: (a) providing first and second decorative coverings; (b) sewing a line of decorative stitching through the first decorative covering along a stitch path; (c) attaching a seam filler to the first decorative covering along the stitch path at a covering inner surface; and (d) disposing each of the first and second decorative coverings over substantially identical vehicle interior component substrates to form first and second vehicle interior components having different decorative stitching configurations.

In another embodiment, the method includes depositing a curable filler material along the stitch path, wherein the curable filler material is configured to adhere to the covering inner surface and to cure to form the attached seam filler.

In another embodiment, the method includes extruding a thermoplastic filler material along the stitch path.

In another embodiment, the method includes attaching a pre-formed seam filler along the stitch path.

In another embodiment, the steps of sewing a line of decorative stitching and attaching a seam filler are performed simultaneously.

In another embodiment, the second decorative covering does not include decorative stitching when disposed over the substrate.

In another embodiment, the method includes sewing a line of decorative stitching through the second covering along a stitch path that is different from the stitch path of the first covering, and attaching a seam filler to the second decorative covering along the different stitch path at an inner surface of the second covering before disposing the coverings over the substrates.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more illustrative embodiments of the invention will hereinafter be described in conjunction with the appended drawings, wherein like designations denote like elements, and wherein.

DETAILED DESCRIPTION OF EMBODIMENT(S)

The following description is directed at various embodiments of vehicle interior components that include decorative stitching and structures and methods for ensuring that the decorative stitching, typically included as a desirable aesthetic feature of such components, does not cause other undesirable aesthetic defects therein. Seam fillers may be used with decorative coverings to support such coverings over a substrate at reduced thickness portions in the coverings that may coincide with the location of the decorative stitching. Such fillers can help prevent local sagging or sinking of the covering at the reduced thickness portions and/or they can be used to form bulges or raised areas in the coverings to help simulate a fold in the covering as part of a simulated seam. Further, certain methods of forming and/or attaching the seam fillers to decorative coverings can offer increased manufacturing flexibility by allowing the use of commonly configured component substrates with differently configured decorative coverings. These and other possible advantages will become apparent in light of the following description.

Figures 1, 2:
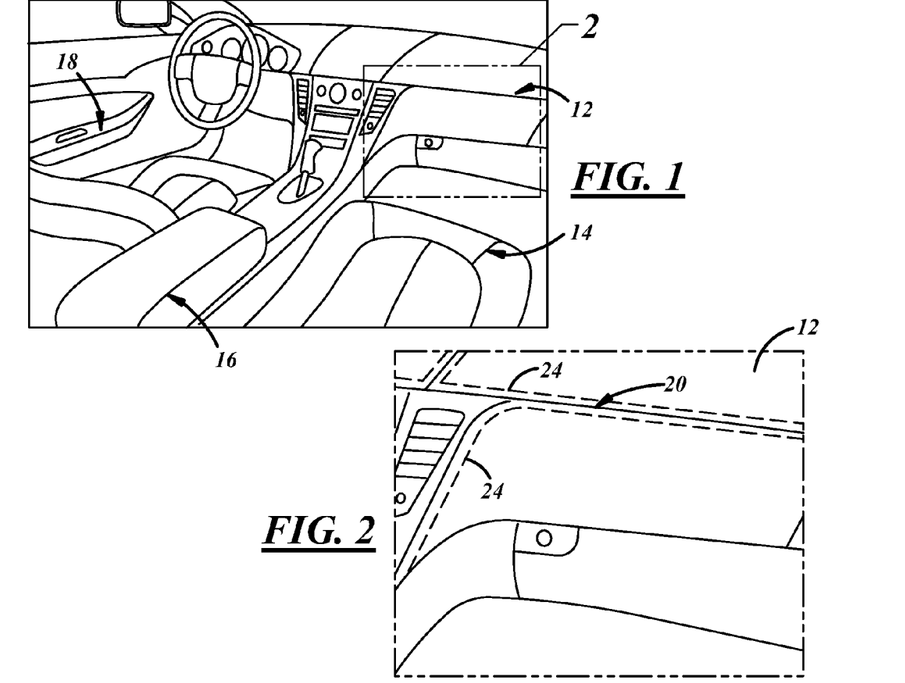
FIG. 1 is a perspective view of a vehicle interior, showing various vehicle interior components that may include decorative stitching.
FIG. 2 is an enlarged view of the instrument panel assembly of FIG. 1, including decorative stitching according to one embodiment.

Referring to FIG. 1, a vehicle interior is shown to illustrate various examples of vehicle interior components that may include coverings with decorative stitching. Instrument panel assembly 12, seat assembly 14, console assembly 16, and door panel assembly 18 may all include decorative coverings disposed over and/or attached to their respective component substrates. The arrows in the figure also point to example locations for seams and/or decorative stitching for each of the components. The coverings and seam fillers disclosed herein may be used with any other interior component as well, such as steering wheel assemblies, shifter assemblies, etc.

FIG. 2 is an enlarged view of a portion of the instrument panel assembly 12 of FIG. 1. The illustrated instrument panel 12 includes one or more seams 20, as shown. Seam 20 may be a functional seam where two portions of covering material are attached to each other, it may be a simulated seam where one or more line(s) of decorative stitching 24 are provided either alone or in combination with other features that simulate a seam, or it may be a functional seam that includes decorative stitching 24. Examples of different types of seams 20 will be detailed below.

Figure 3:
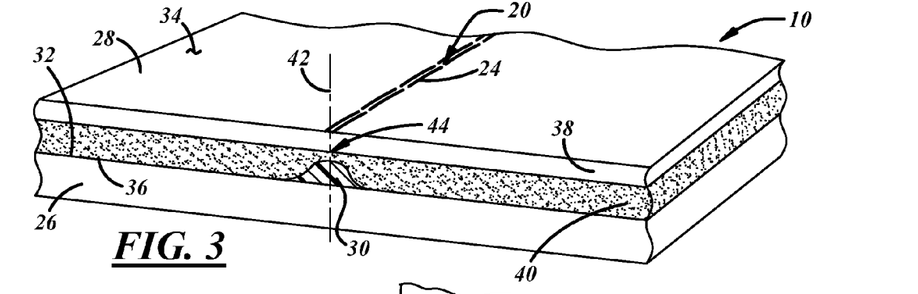
FIG. 3 is a cross-sectional perspective view of a vehicle interior component, showing a seam filler arranged along the stitch path of a simulated seam, according to one embodiment.

Referring now to FIG. 3, a cross-sectional view of one example of a vehicle interior component 10 is shown with a simulated seam 20 formed therein that includes decorative stitching 24. Component 10 includes a substrate 26, a decorative covering 28 disposed over the substrate, and a seam filler 30 located between the substrate and the covering. The substrate 26 forms the overall three-dimensional shape of the particular vehicle interior component and includes an outer surface 32. In the case of an instrument panel, the substrate 26 is at least partly structural in nature in that it supports and/or provides attachment locations for other vehicle components, like HVAC components, airbag components, etc. It can be formed from any suitable material such as filled or unfilled plastics, metals, or combinations thereof. In one embodiment, substrate 26 is constructed from a material that includes a thermoplastic olefinic material such as polypropylene, and may be reinforced with 20-30% glass fiber. The substrate 26 thickness may range from about 2.0 mm to about 4.0 mm where plastic materials are used in its construction. Outer surface 32 may be generally smooth and continuous with the exception of openings or other functional features. In one embodiment, the substrate does not include any standing or proud features such as ribs or bosses along the outer surface at or near the seam 20.

Decorative covering 28 overlies the substrate 26 to provide a desired aesthetic and may be attached to the substrate with a suitable adhesive or by other means. Covering 28 includes an outer surface 34 and an opposite inner surface 36 that faces the substrate outer surface 32 as shown. At least a portion of inner surface 36 is in contact with the substrate outer surface 32. In this particular embodiment, covering 28 includes a decorative skin layer 38 and an inner layer 40 sandwiched between the skin layer 38 and the substrate 26. In the bi-layer construction shown, the skin layer 38 includes the covering outer surface 34, and the inner layer 40 includes the covering inner surface 36. In other embodiments, covering 28 may be formed from a single layer of material or may include one or more additional layers between the skin and inner layers 38, 40.

Skin layer 38 is generally decorative and may be constructed from a pliable material such as those typically used in vehicle interiors, including TPO, TPE, PVC, PUR, leather, simulated leather, or other types. Material selection may be based on a number of factors, including the desired type of texture for outer surface 34, the tactile feel of the material, cost, processability, or others. Inner layer 40 may be constructed from a compressible foam material to provide a cushioned feel to the covering 28 and to the vehicle component 10. Examples of foam materials for inner layer 40 include polyolefin-based foam, polyurethane foam, acrylic-based foam, or polyester foam, to name a few. Other non-foam materials such as felt or textile fibers may be used as well. Layers 38 and 40 may be initially provided as separate unattached layers for assembly to substrate 26, or they may be co-extruded, laminated, adhesively bonded or otherwise attached to each other to form covering 28 separately from substrate 26.

Individual layer thicknesses may vary, but the overall nominal thickness of covering 28 may range from about 0.2 mm to about 6 mm, in accordance with the individual layer thicknesses, and preferably ranges from about 1.0 mm to about 4.0 mm. The thickness of skin layer 38 may range from about 0.2 mm to about 1.0 mm, and preferably ranges from about 0.3 mm to about 0.7 mm. The selected skin layer thickness depends on several variables such as material type, manufacturability, and desired aesthetic, to name a few. The thickness of inner layer 40 may range from about 0.5 mm up to about 5.0 mm or higher, depending on the desired tactile feel of the interior vehicle component. In one embodiment, covering 28 has an overall thickness of about 2.0 mm, where the skin layer 38 is about 1.0 mm thick and the inner layer 40 is about 1.0 mm thick. In another embodiment, the skin layer is about 0.5 mm thick, and the inner layer is about 3.5 mm thick, so that the overall covering thickness is 4.0 mm. Of course, these are non-limiting examples, as there are several suitable combinations of layer thicknesses. These example ranges are nominal ranges, as some covering features can locally affect covering thickness.

Seam 20 is formed in covering 28 so that it is visible from the interior of the vehicle. Seam 20 may be a functional seam where two separate portions of a covering are attached together, or it may be a simulated seam. The particular seam 20 shown in FIG. 3 is a simulated seam that includes a line of decorative stitching 24 along a stitch path 42, represented in FIG. 3 by a dashed line at the cross-section. The stitch path 42 lies along a curvilinear surface that is generally perpendicular to the covering surfaces and passes through the line of decorative stitching 24. A stitch path location may be pre-determined for each individual element of the component 10. For example, the covering 28 may have a pre-determined stitch path location along its surfaces that sewing equipment will generally follow when sewing the line of decorative stitching 24 through the covering. The substrate 26 includes a corresponding pre-determined location along its outer surface directly over which the covering stitch path is intended to lie. The line of decorative stitching is sewn through the opposite surfaces 34, 36 of the covering 28.

The stitch path 42 and corresponding line of decorative stitching can be in any curvilinear shape along the component surfaces—i.e., the term "line" is not meant to limit the shape of the stitch path 42 to a straight line. Skilled artisans will recognize that the line of decorative stitching comprises multiple interconnected loops of thread that pass through the covering 28 along the stitch path 42. The portion of the covering 28 that lies along the stitch path may be at least partially compressed by these loops of thread during the sewing operation as the sewing equipment maintains proper thread tension. As shown in FIG. 3, a reduced thickness portion 44 of the covering 28 may result. This may particularly be the case where the covering includes a compressible foam inner layer 40. Reduced thickness portion 44 is reduced in thickness relative to the nominal covering thickness and generally lies along the stitch path 42.

Seam filler 30 may be provided to account for at least a portion of the difference in the nominal thickness of the covering 28 and the reduced thickness at portion 44. The shape of the seam filler generally follows the shape of the stitch path so that the seam filler can help support the decorative covering directly beneath at least a portion of the line of decorative stitching. The seam filler 30 may have an elongated shape and/or have a generally uniform cross-section along its length. In the embodiment of FIG. 3, the seam filler 30 includes a notch-shaped cross-section centered at the reduced thickness portion 44. In one embodiment, the seam filler 30 is more compressible than the substrate but less compressible than the covering. Thus a seam filler 30 placed between the covering and the substrate may assume a shape that is somewhat flatter than its original shape when assembled into the vehicle component 10. Other seam filler cross-sectional shapes will be described in further detail in conjunction with other figures.

Seam filler 30 can be made from a variety of materials, and the materials may selected based on several factors such as relative compressibility, cost, ease of shaping it to follow the stitch path, desired attachment method when applicable, or other factors. For example, seam filler compressibility may be tailored so that it sufficiently supports the covering directly beneath the reduced thickness portion of the covering, and so that the seam filler "gives" when pressed on. A material that compresses more than another material under the same load has a higher relative compressibility than the other material. The overall desired effect may be that a simulated seam 20 feels like a functional seam because when pressed by hand, the seam 20 feels as if an edge of material is folded under itself at the seam.

In one embodiment, the seam filler material is selected based on its ability to transform between a solid phase and a liquid or viscous phase during processing. For example, a curable filler material may be selected to form the seam filler in place at the desired location. As used herein, curable filler materials are polymer-based materials that can be deposited as a viscous liquid or flowable material and subsequently harden to a more solid state. Such polymer-based materials may generally be divided into thermoplastic materials and thermosetting materials. In one embodiment, the curable filler material is a thermoplastic material than can be heated to a viscous liquid or melt phase, deposited over a surface, and cooled to a solid phase. The process of thermoplastic material solidification is a form of curing, as used herein. Some examples of suitable thermoplastic filler materials include PP, TPO, or TPE. It may be preferable, consistent with the methods described below, to select a thermoplastic material from the same material family as the substrate material, the covering material at the inner surface, or both. For example, an olefin-based filler material may be selected where the covering material is polypropylene foam at the inner surface, or a urethane-based filler material be selected where the covering material is urethane foam at the inner surface.

In another embodiment, the curable filler material is a thermosetting material that can be deposited in a viscous liquid phase, where a chemical reaction occurs within the deposited material that causes it to solidify. The process of material solidification by chemical reaction is a form of curing, as used herein, and often includes cross-linking in thermosetting materials. Some examples of suitable thermosetting filler materials include certain urethane materials, acrylic materials, or polysiloxanes, to name a few. One non-limiting example is a two-component urethane material comprising a liquid polyol component and a liquid isocyanate component that are mixed to form the curable filler material. The two components react when mixed, gradually changing from liquid to solid as cross-linked polyurethane is formed by the reaction. Another non-limiting example is a one-component polysiloxane material that is applied as a viscous liquid and reacts with water, oxygen, or some other atmospheric gas to cross-link and thereby solidify. The curable filler material may include a mixture of thermoplastic and thermosetting materials in some cases. Other materials may be considered curable filler materials, such as a polymer-solvent system that may be deposited in a gel-like and subsequently harden via solvent evaporation.

In other embodiments, the seam filler is pre-formed for subsequent attachment to the decorative covering rather than being formed in place. These types of pre-formed seam fillers can be constructed from nearly any material, including textile materials, synthetic foam materials, semi-rigid plastics, elastomers, or certain metals in some cases. Pre-formed seam fillers may be constructed from more than one type of material, such as a plastic portion attached to a felt portion, for example. Seam fillers formed in place with curable filler materials may also include more than one material, such as side-by-side portions of materials having different properties, such as hardness, when cured.

Prior to the covering being disposed over the substrate, the seam filler 30 may be attached to the substrate 26, the covering 28, or both the substrate and the covering, by any suitable technique sufficient to hold the filler 30 in place until the component 10 is assembled. In one embodiment, the seam filler 30 is attached to the covering 28 by adhesion. For example, the seam filler 30 may be formed in place by depositing a curable filler material along the stitch path of the covering. The curable filler material, applied as a viscous liquid, can wet-out and adhere to the covering inner surface during deposition so that the cured seam filler is attached to the covering. Pre-formed seam fillers may be provided as peel-and-stick fillers in some embodiments, or can be attached by a separate adhesive material and/or sewn to the covering inner surface in other embodiments. In one particular embodiment, the decorative stitching 24 attaches a pre-formed seam filler 30 to the covering 28. In that case, decorative stitching 24 is partly functional, in that the lower end of the stitching passes through the seam filler to attach it to the inner surface 36 of the covering 28, though still not part of a functional seam (in which two separate portions of covering material are joined).

Figure 4:
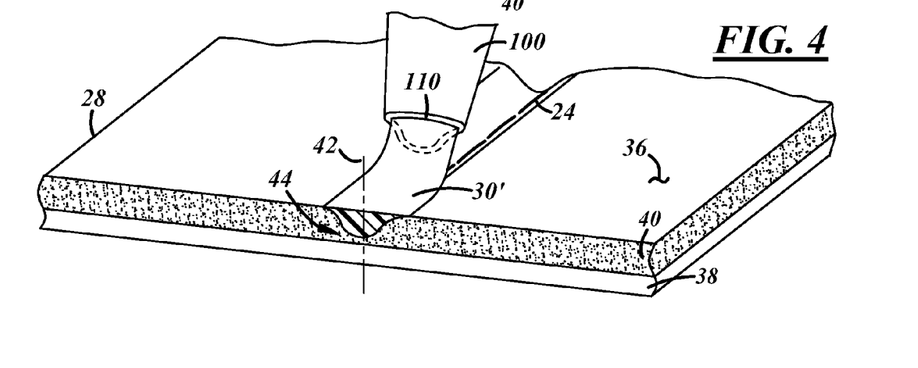
FIG. 4 is a perspective view of the decorative covering of the vehicle interior component of FIG. 3, showing a curable filler material being deposited along the stitch path.

With reference to FIG. 4, in relevant part, one embodiment of a method of making a vehicle interior component having decorative stitching will be described. The method may include the steps of providing a decorative covering 28 and a vehicle interior component substrate, sewing a line of decorative stitching 24 through the decorative covering, depositing a curable filler material 30' along a stitch path 42, and disposing the covering 28 over the substrate. FIG. 4 illustrates an example of the step of depositing the curable filler material 30'. Filler material 30' can cure to form the seam filler 30 of FIG. 3. As illustrated, the filler material 30' can be deposited using an applicator 100 through which the filler material 30' flows from a source toward an opening 110 at the end of the applicator. The opening 110 may be shaped generally the same as the desired cross-section of the seam filler 30, accounting for any anticipated expansion or contraction of the filler material during curing. Some examples of seam filler cross-sections in conjunction with different examples of seams will be presented below. Applicator 100 may include or be attached to other components such as a mixing head or chamber, heating elements, valves, material storage containers, etc.

In another embodiment, the curable filler material is deposited along a path or location at the substrate outer surface that corresponds with the location of the stitch path of the covering. That is to say that the desired location of the seam filler may be known ahead of time in relation to the substrate, and the curable filler material can be applied at that location in addition to or instead of being applied only to the covering. The location of the applicator 100 relative to the covering or substrate can be controlled by robotic or other control systems during the deposition of the filler material in either case. When the covering is disposed over the substrate, the covering stitch path directly overlies the corresponding substrate location.

In some cases, the amount of filler material deposited to form the seam filler may be in excess of the amount required to fill the reduced thickness portion of the covering. This may be desirable where an additional ridge or raised feature is desired on the finished interior component. Excess filler material may also be deposited in instances where the opening 110 of the applicator 100 is not necessarily the same shape as the reduced thickness portion of the covering. For example, a circular bead of material 30' may be deposited in an excess amount at the notch-shaped reduced thickness portion of the covering. At least some of the excess material can be removed by wiping a blade or other tool along the inner surface of the covering and along the deposited material before it cures, thereby making the filler material flush with the covering inner surface. This wiping or removal step can simultaneously force uncured filler material into the notch at the reduced thickness portion of the covering to fill it out before it cures. Alternatively, excess amounts of deposited material can fill out the reduced thickness portion of the covering when the covering is deposited over the substrate before the filler material cures. In this case, the excess filler material comes into contact with the substrate and is squeezed between the substrate and the covering to take the shape of the reduced thickness portion of the covering.

The curable filler material can be in any state of cure when the covering material is disposed over the substrate. For example, the filler material may be deposited immediately before the covering is disposed over the substrate—i.e., before the filler material has had any substantial time to cure. In another embodiment, the filler material can be substantially cured when the covering is disposed over the substrate. This may be useful where the seam filler is made larger than the gap between the covering and the substrate to form an additional bulge or raised area in the covering. In other cases, just enough curing is allowed so that the component can be handled without disturbing the shape of the deposited material. It is also possible that the curable filler material is deposited at the inner surface of the covering before the decorative stitching is sewn through the covering. For example, certain elastomeric materials, softer thermoplastics, or foam materials may be capable of forming a seam filler that a sewing needle can effectively penetrate. Depending on the filler material type, curing may occur at ambient conditions over time, may require an additional process step to occur, or can optional include an additional process step to accelerate curing. For example, heat may be used with some thermosetting materials to initiate and/or accelerate curing. Or cooling may be used with thermoplastic materials to accelerate curing. Other process steps may be used with materials having different types of curing agents, such as UV-curable materials, for example.

Forming the seam filler in a separate step from forming the substrate may offer increased manufacturing and/or design flexibility. For example, while it may be possible to mold or otherwise form a rib or other upstanding feature along the outer surface of the substrate to support the covering beneath the covering at the decorative stitching and help prevent visual defects at the reduced thickness area of the covering, such a technique can limit the location of a covering seam to the fixed location of the rib. To change the location of a seam in that case, additional molding tools would have to be constructed to mold different substrates or expensive tool modifications would have to be made. The methods described herein can allow a common substrate from a single molding tool to be used both with a plainer, lower cost decorative covering for a lower trim level vehicle, and with a more decorative covering (e.g., one having simulated French seams) for a higher trim level vehicle. Or a vehicle manufacturer can update the look of a vehicle interior from model year to model year by changing the decorative stitching configuration while utilizing the same substrate from a previous model year. Of course, substrate ribs may still be utilized along with seam fillers where desired.

Thus, another embodiment of a method of making vehicle interior components having common substrates and different outward appearances includes the steps of providing first and second decorative coverings, sewing a line of decorative stitching through at least one of the decorative coverings along a stitch path, attaching a seam filler to the decorative covering(s) along the stitch path(s), and disposing each of the coverings over substantially identical substrates to form two interior components having different stitching configurations. As used herein, one stitching configuration is different from another when it has a shape, location along the covering, and/or stitching pattern that is different from the other. For purposes of this description, one example of a stitching configuration for an interior vehicle component is the absence of decorative stitching. In other words, two vehicle interior components have different decorative stitching configurations when one of them includes decorative stitching and the other one does not. Accordingly, in one embodiment, the method includes sewing a line of decorative stitching through the first decorative covering, but not through the second decorative covering. In another embodiment, the method includes sewing lines of decorative stitching through both the first and second decorative coverings along different stitch paths that result in different stitching configurations among the two finished interior components.

The seam filler may be a pre-formed seam filler, as described above, or it may be a seam filler that is formed in place by depositing a curable filler material along the stitch path. The step of attaching the seam filler to the decorative covering may be performed by any of the previously described techniques. For example, the seam filler may be attached to the covering by adhesion of the curable filler material to the covering, where applicable. Or a pre-formed seam filler may be attached to the covering by adhesion, sewing, or other techniques. In either case, pre-formed or formed in place, the attachment may be performed simultaneously with the decorative stitching. The decorative stitching may function to attach a pre-formed seam filler to the covering, for example. In another embodiment, a bead of curable filler material is deposited along the stitch path just after the location of the needle that performs the sewing operation. These example methods may be part of overall methods having additional steps. For example, the individual steps may be broken down into multiple other steps, or additional steps may be added before, after, simultaneous with, or between those described above.

Figure 5:
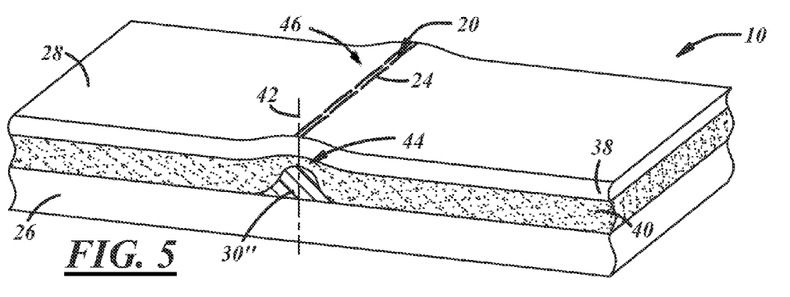
FIG. 5 is a cross-sectional perspective view of a vehicle interior component, showing a seam filler arranged along the stitch path of a simulated seam, according to another embodiment.

The following example seam filler profiles and corresponding seams may be provided using any of the above-described methods, including deposition of a curable filler material and/or attachment of a pre-formed seam filler. FIG. 5 illustrates an example of a vehicle component 10 that includes a simulated seam 20 that is a variation of the seam of FIG. 3. The seam filler 30' has a larger (taller) cross-section than that of the seam filler 30 of FIG. 3. The seam filler 30' is configured so that it accounts for the reduced thickness portion 44 of the covering and includes additional thickness, thus creating a raised feature or visible ridge 46 as part of seam 20. Ridge 46 may help simulated seam 20 appear more like a functional seam, as functional seams often have edges of joined material folded under the material at the seam, resulting in a similar bulge or ridge along the seam. In one embodiment, the seam filler may be located along the inner surface of the covering along a stitch path that does not have a corresponding reduced thickness portion, either because the inner layer is not compressible, or for other reasons. In such an embodiment, the seam filler may be provided to help form or shape a ridge in the finished component.

Figure 6:
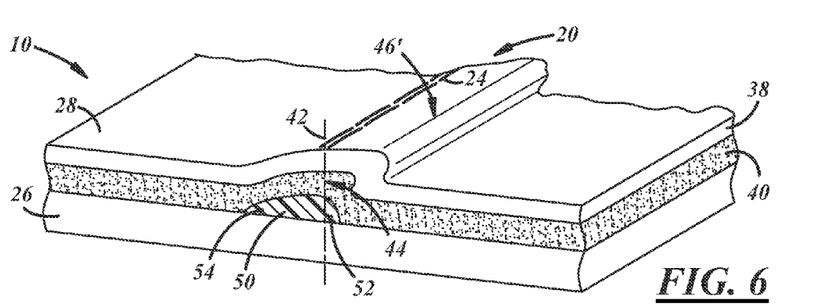
FIG. 6 is a cross-sectional perspective view of a vehicle interior component, showing a seam filler arranged along the stitch path of a simulated deck seam, according to one embodiment.

In another embodiment, shown in FIG. 6, the vehicle component 10 includes a simulated deck seam 20. This type of simulated seam can appear as if one portion of material has an edge folded under and sewn over the top of an edge of an adjacent portion of material. This embodiment includes a pre-formed ridge 46' that may be formed in the covering 28 generally parallel to the pre-determined stitch path 42 prior to the covering 28 being disposed over the substrate 26. Ridge 46' is an upstanding or proud ridge and may be a more distinct or more sharply defined feature than the more subtle ridge 46 of FIG. 5. Ridge 46' can be formed in thermoplastic or other thermoformable covering materials by a thermoforming or a pressure/vacuum assisted thermoforming process in which the covering is heated and forced against a die having the desired profile. In one embodiment, ridge 46' is thermoformed at the same time a grain pattern is embossed or impressed along the outer surface of the covering in an in-mold graining (IMG) process.

Seam filler 50 of FIG. 6 has a cross-section that is non-uniform in thickness and non-symmetric with respect to the stitch path 42. In this example, a main portion 52 of seam filler 50 lies along the stitch path 42 and is thicker than auxiliary portion 54 that extends away from the stitch path. The cross-sectional shape of the seam filler 50 may be tapered from thick to thin from main portion 52 toward auxiliary portion 54, as shown, or the two portions may simply have two different thicknesses. In the illustrated embodiment, the main portion 52 is the thickest portion of the seam filler. Other embodiments, including those shown in FIGS. 3 and 5, may also be arranged so that the thickest portion of the seam filler is located along the stitch path 42, but this is not necessarily always the case. The amount of taper or the difference in the thickness from main portion 52 to auxiliary portion 54, along with the total width of the seam filler 50, may be used to tailor or modify the finished appearance of pre-formed ridge 46'. For example, auxiliary portion 54 may have a thickness that is the same as or greater than the thickness of the main portion 52 to increase the prominence of the ridge where it extends away from the stitch path 42 to simulate a greater amount of material overlap in the simulated seam 20.

Figures 7, 8, 9, 10:
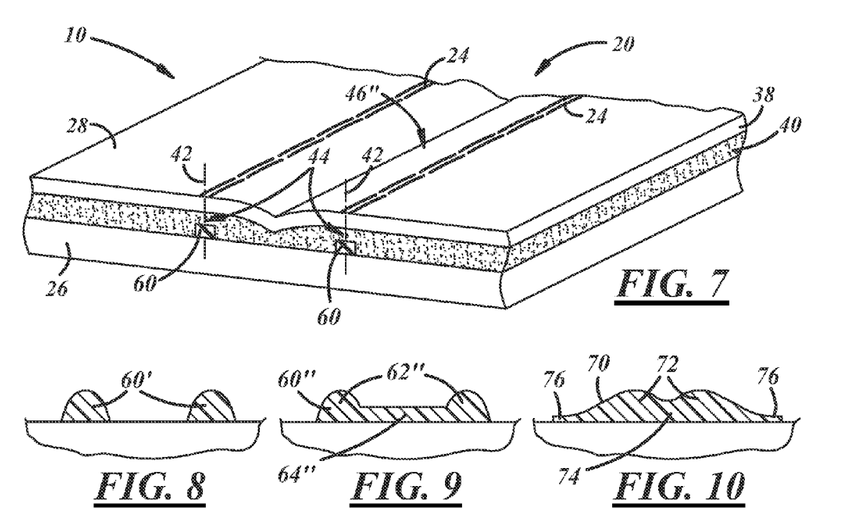
FIG. 7 is a cross-sectional perspective view of a vehicle interior component, showing a seam filler arranged along the stitch path of a simulated French seam, according to one embodiment.
FIG. 8 is an example of a seam filler profile.
FIG. 9 is another example of a seam filler profile.
FIG. 10 is yet another example of a seam filler profile.

Turning now to FIG. 7, the vehicle component 10 may include a simulated French seam 20. This type of simulated seam can appear as if two portions of material are sewn together with the extra material of each portion folded under and sewn to itself. This embodiment includes a pre-formed ridge 46" that may be formed in the covering 28 generally parallel to the pre-determined stitch path 42 prior to the covering 28 being disposed over the substrate 26. This version of ridge 46" is a depression or downstanding ridge, and may also be formed in a thermoforming process. Simulated seam 20 of FIG. 7 includes two lines of decorative stitching 24 along spaced apart stitch paths 42, equally spaced from and parallel to ridge 46". In this example, two separate seam fillers 60 are included along respective stitch paths 42 and beneath the lines of decorative stitching 24.

FIGS. 8-10 illustrate different examples of seam filler profiles. Each of these filler profiles is configured for use with simulated French seams or other types of dual stitch seams, whether simulated or functional. Each profile is shown overlying a substrate surface with the covering omitted for simplicity. FIG. 8 illustrates dual seam fillers 60', similar to those of FIG. 7 except that they are rounded at the covering side or top of their profiles. FIG. 9 illustrates another example seam filler profile 60" that includes two main portions 62" for arrangement along a stitch path, and auxiliary portion 64" connecting the two main portions. When the seam filler profile 60" of FIG. 9 is used with the same substrate and covering combinations as the profiles of FIG. 7 or 8, the appearance of the finished component may differ in that the simulated seam is more prominent between the lines of decorative stitching because the filler element 60" spaces the covering further away from the substrate. The resulting appearance of the simulated French seam may by more realistic due to the appearance that additional material is folded under and sewn to itself.

FIG. 10 illustrates yet another example seam filler profile 70 that includes dual main portions 72, center auxiliary portion 74, and edge auxiliary portions 76. As with the profile of FIG. 9, the resulting appearance of the overlying seam will include a prominent appearance due to portion 74, enhancing the illusion that additional material is folded under at the seam and sewn to itself. Edge portions 76 may be provided for a more gradual transition from any proud feature of the overlying seam to adjacent seamless areas of the covering. While the seam filler profiles of FIGS. 8-10 are configured for use with dual lines of decorative stitching, skilled artisans will appreciate that portions of these and other profiles may be used with seams having more or less lines of decorative stitching.

The size and shape of the seam fillers may vary widely depending on the particular application, but a typical vehicle interior seam may range in width from about the width of a line of stitching to about 20 mm when ridge features are taken into account. A typical French seam may have its dual lines of decorative stitching arranged so that they are about 6 mm to about 10 mm apart. In one embodiment, the spacing between the lines of decorative stitching, and the spacing between main portions of the underlying seam filler, is about 8 mm. The thickness of the seam fillers, or height of the seam filler profiles, can range from near zero up to about 3 mm. In one embodiment, the thickest portion of the seam filler is about 2 mm. In another embodiment, such as embodiments that use a seam filler profile similar to that of FIG. 9, the main portions of the seam filler are about 2 mm thick, and the connecting auxiliary portion is about 1 mm thick. These are of course non-limiting examples of seam and seam filler dimensions that are provided to illustrate the general size scale in covering seam applications.

Any of the above described seam filler profiles or cross-sectional shapes, whether provided as pre-formed seam fillers or formed in place, can be used not only with simulated seams, but also with functional seams or seams having both functional and decorative stitching. The use of seam fillers according to these and other embodiments along covering stitch paths to fill gaps or voids caused by sewing decorative stitching through covering materials may enhance the final appearance of the vehicle interior component by supporting the covering over the substrate at reduced thickness portion(s) so that an undesirable sunken area in the covering is prevented along the stitch path. As is apparent from the above description, these seam fillers may offer the additional advantage of enhancing the illusion of a true seam, such as a deck seam or French seam, by creating additional raised features or bulges in the covering material as if the covering material is folded under at the simulated seam. Additionally, these types of seam fillers can be attached to the covering, rather than being molded into the underlying substrate in the form of ribs or other standing substrate features, offering additional manufacturing and design flexibility.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of making a vehicle interior component having decorative stitching, comprising the steps of:
    (a) providing a decorative covering and a vehicle interior component substrate;
    (b) sewing a line of decorative stitching through the decorative covering along a stitch path such that the line of decorative stitching compresses the decorative covering to form a reduced thickness portion along the stitch path defined by a depression along an inner surface of the decorative covering;
    (c) depositing a bead of curable filler material in a viscous liquid phase along the covering stitch path or along a corresponding substrate location or along both, and curing the filler material, wherein the cured filler material is more compressible than the substrate and less compressible than the decorative covering; and
    (d) disposing the decorative covering over the component substrate so that the covering stitch path is aligned over the corresponding substrate location and the filler material supports the decorative covering beneath the depression to help prevent a visible sunken area along the stitch path.

2. The method of claim 1, wherein step (c) includes extruding a thermoplastic filler material.

3. The method of claim 1, wherein step (c) includes depositing a thermosetting filler material.

4. The method of claim 1, wherein step (c) includes depositing the curable filler material along the stitch path at the inner surface of the decorative covering.

5. The method of claim 4, wherein step (b) is performed before step (c).

6. The method of claim 4, wherein step (c) includes depositing an amount of curable filler material in excess of an amount required to fill a reduced thickness portion of the covering formed during step (b).

7. The method of claim 6, further comprising the step of:
    removing at least some of the excess amount of curable filler material so that the curable filler material is substantially flush with the inner surface of the covering.

8. The method of claim 1, further comprising the step of:
    at least partially curing the filler material after step (c) and before step (d).

9. A method of making vehicle interior components having common substrates and different outward appearances, comprising the steps of:
    (a) providing first and second decorative coverings;
    (b) sewing a line of decorative stitching through the first decorative covering along a stitch path to form a depression along an inner surface of the first decorative covering;

(c) attaching a seam filler to the first decorative covering along the stitch path at a covering inner surface; and curing the filler material wherein the cured filler material is more compressible than the substrate and less compressible than the decorative covering (d) disposing each of the first and second decorative coverings over substantially identical vehicle interior component substrates to form first and second vehicle interior components having different decorative stitching configurations;

wherein step (c) includes the step of depositing a bead of curable filler material in a viscous liquid phase along the stitch path, wherein the curable filler material is configured to adhere to the inner surface and to cure to form an attached seam filler.

10. The method of claim 9, wherein step (c) includes extruding a thermoplastic filler material along the stitch path.

11. The method of claim 9, wherein step (c) includes the step of:

attaching a pre-formed seam filler along the stitch path.

12. The method of claim 9, wherein step (b) and step (c) are performed simultaneously.

13. The method of claim 9, wherein the second decorative covering does not include decorative stitching at step (d).

14. The method of claim 9, further comprising the steps of:

sewing a line of decorative stitching through the second covering along a stitch path that is different from the stitch path of step (b); and attaching a seam filler to the second decorative covering along the different stitch path at an inner surface of the second covering, both before step (d).

15. The method of claim 1, wherein the bead of curable filler material is deposited along the reduced thickness portion so that the filler material accounts for at least a portion of the difference between the nominal thickness of the covering and the thickness of the covering at the reduced thickness portion.

16. The method of claim 1, wherein the decorative covering provided in step (a) includes a decorative skin layer and a foam inner layer attached together.

17. The method of claim 1, wherein, after step (d) the bead of filler material is in contact with an inner surface of the decorative covering and with an outer surface of the substrate so that the bead of filler material spaces said surfaces apart at the stitch path.

18. The method of claim 9, wherein the substantially identical substrates are instrument panel substrates.

19. The method of claim 9, wherein the second decorative covering does not have an attached seam filler at step (d).

* * * * *